US012598215B1

(12) United States Patent
 Chandrashekar et al.

(10) Patent No.: US 12,598,215 B1
(45) Date of Patent: Apr. 7, 2026

(54) CENTRALIZED SECURE POLICY CONFIGURATION SYNCHRONIZATION MECHANISM FOR VIRTUAL NETWORK DEVICES

(71) Applicant: Juniper Networks, Inc., Sunnyvale, CA (US)

(72) Inventors: Amith Ramanagar Chandrashekar, San Jose, CA (US); Avinash Kumar Singh, Fremont, CA (US); Xiaodong Zhu, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 350 days.

(21) Appl. No.: 18/342,261

(22) Filed: Jun. 27, 2023

(51) Int. Cl.
 *H04L 9/40* (2022.01)
 *H04L 41/0895* (2022.01)

(52) U.S. Cl.
 CPC .......... *H04L 63/20* (2013.01); *H04L 41/0895* (2022.05)

(58) Field of Classification Search
 CPC ............................. H04L 63/20; H04L 41/0895
 See application file for complete search history.

(56) References Cited

U.S. PATENT DOCUMENTS

| | | | | |
|---|---|---|---|---|
| 9,866,594 B2 * | 1/2018 | Lim | ........................ | H04L 63/10 |
| 11,120,156 B2 * | 9/2021 | Handy Bosma | ...... | H04L 9/3239 |
| 2014/0122672 A1 * | 5/2014 | Chen | ................... | H04L 41/0894 709/221 |
| 2014/0189050 A1 * | 7/2014 | Rijsman | .............. | G06F 9/45558 709/217 |

OTHER PUBLICATIONS

RLI 49000: Functional specification, "vSRX Deployment with AWS GWLB," Website: https://github.com/Juniper/vSRX-AWS/tree/master/vSRX_AWS_GWLB#local-config-sync, Obtained May 1, 2024, 11 Pages.
Amazon EC2 Auto Scaling, User Guide, Website: https://docs.aws.amazon.com/autoscaling/ec2/userguide/what-is-amazon-ec2-auto-scaling.html, 2023, 445 Pages.
Amazon Elastic Compute Cloud, User Guide for Linux Instances, Website: https://docs.aws.amazon.com/AWSEC2/latest/UserGuide/user-data.html, 2023, 2141 Pages.
Junos PyEZ Developer Guide, Juniper Networks, Website: https://www.juniper.net/documentation/us/en/software/junos-pyez/junos-pyez-developer/index.html, Oct. 31, 2022, 333 Pages.

* cited by examiner

*Primary Examiner* — Sm A Rahman
(74) *Attorney, Agent, or Firm* — Harrity & Harrity, LLP

(57) ABSTRACT

A device may detect a first event associated with modifying a policy configuration for a group of virtual network devices of a cloud computing environment, and may retrieve the modified policy configuration. The device may receive the policy configuration from the group, and may cause policy statements not included in the modified policy configuration and included in the policy configuration to be deleted from the group. The device may cause policy statements included in the modified policy configuration and not included in the policy configuration to be added to the group. The device may detect a second event associated with adding a new virtual network device to the group, and may cause the new virtual network device to be created. The device may retrieve a policy configuration associated with the group, and may provide the policy configuration to the new virtual network device for installation.

20 Claims, 9 Drawing Sheets

100

115

Cause a virtual network device to be removed from the group of virtual network devices based on the event being to remove a virtual network device from the group Configuration system Virtual network devices Cloud computing environment

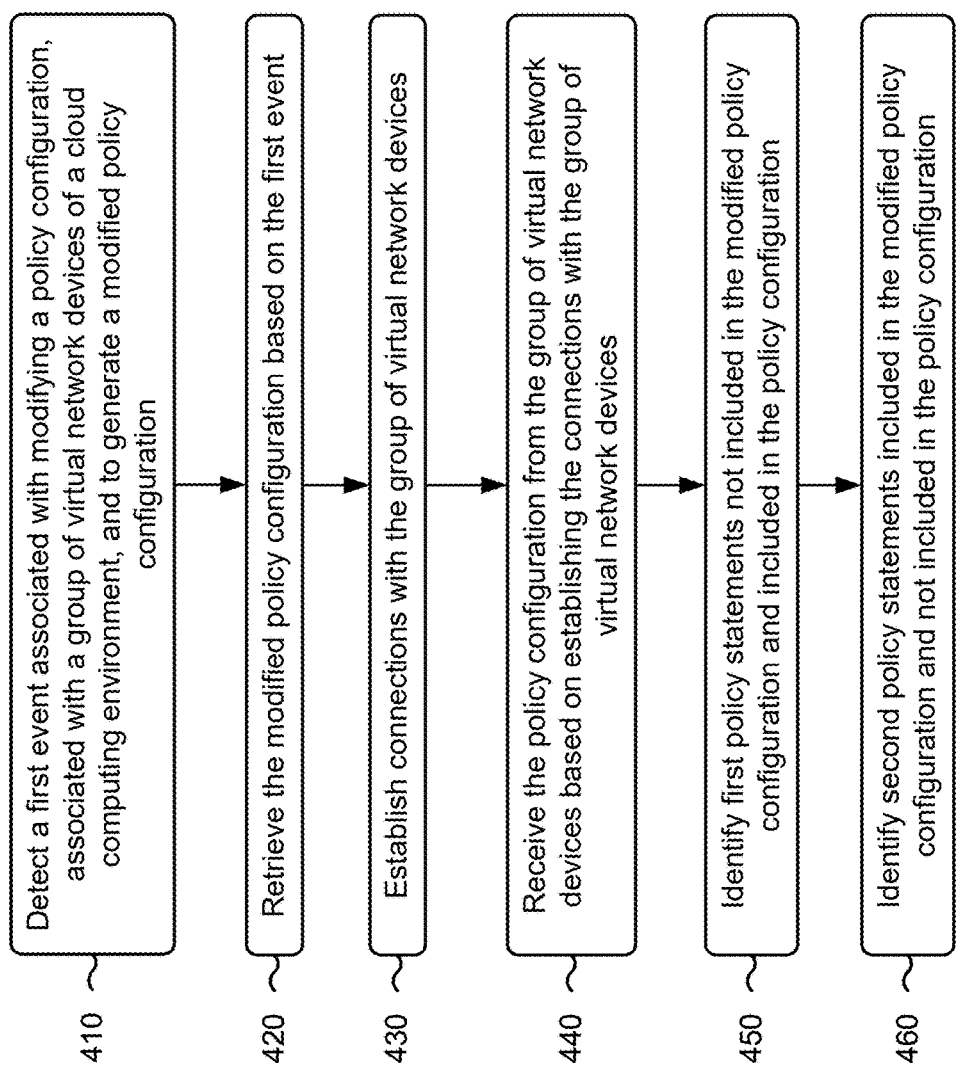

400 —

410 — Detect a first event associated with modifying a policy configuration, associated with a group of virtual network devices of a cloud computing environment, and to generate a modified policy configuration 420 — Retrieve the modified policy configuration based on the first event 430 — Establish connections with the group of virtual network devices 440 — Receive the policy configuration from the group of virtual network devices based on establishing the connections with the group of virtual network devices 450 — Identify first policy statements not included in the modified policy configuration and included in the policy configuration 460 — Identify second policy statements included in the modified policy configuration and not included in the policy configuration

FIG. 4

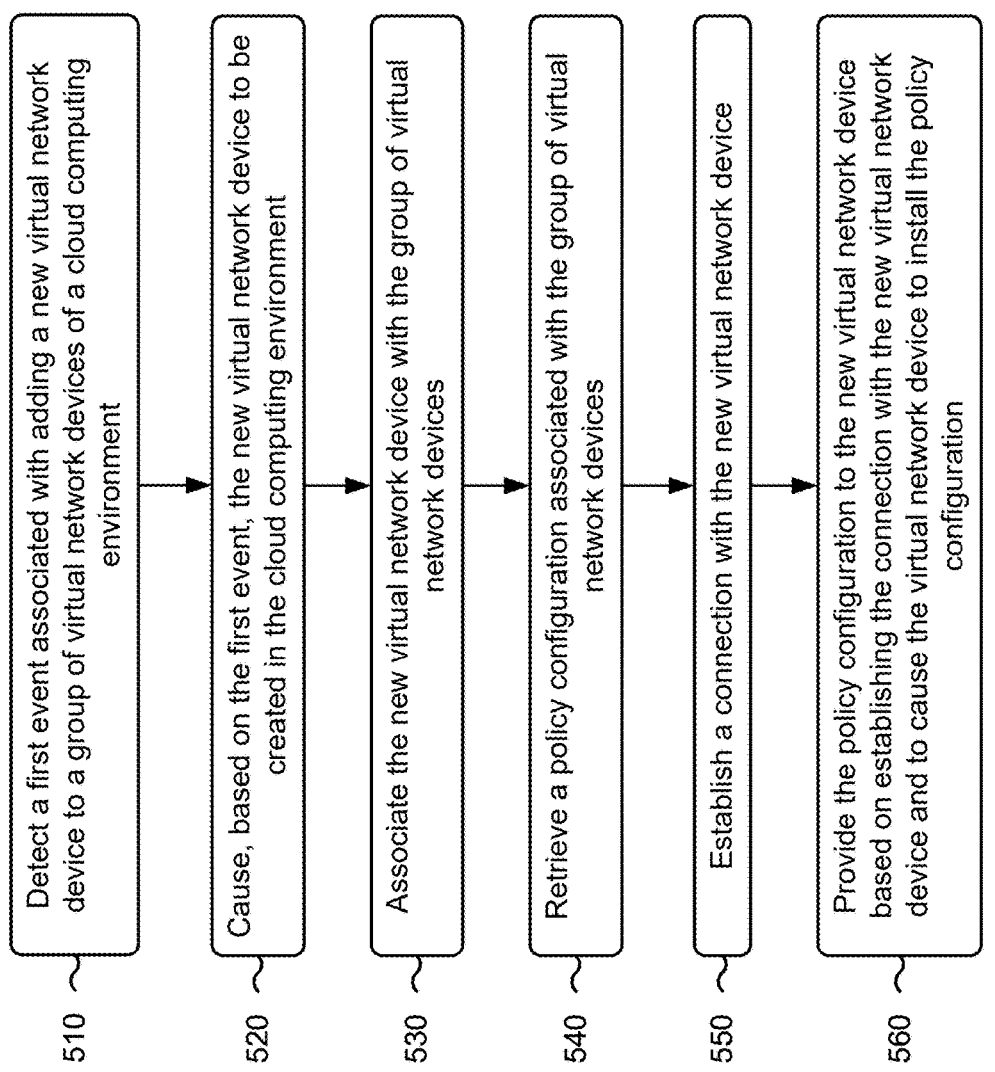

510 — Detect a first event associated with adding a new virtual network device to a group of virtual network devices of a cloud computing environment 520 — Cause, based on the first event, the new virtual network device to be created in the cloud computing environment 530 — Associate the new virtual network device with the group of virtual network devices 540 — Retrieve a policy configuration associated with the group of virtual network devices 550 — Establish a connection with the new virtual network device 560 — Provide the policy configuration to the new virtual network device based on establishing the connection with the new virtual network device and to cause the virtual network device to install the policy configuration

CENTRALIZED SECURE POLICY CONFIGURATION SYNCHRONIZATION MECHANISM FOR VIRTUAL NETWORK DEVICES

BACKGROUND

An infrastructure as a service (IaaS) vendor may provide a scaling service to group several virtual network devices so that the virtual network devices may attach seamlessly to network load balancers.

SUMMARY

Some implementations described herein relate to a method. The method may include detecting a first event associated with modifying a policy configuration, associated with a group of virtual network devices of a cloud computing environment, and to generate a modified policy configuration, and retrieving the modified policy configuration based on the first event. The method may include establishing connections with the group of virtual network devices, and receiving the policy configuration from the group of virtual network devices based on establishing the connections with the group of virtual network devices. The method may include identifying first policy statements not included in the modified policy configuration and included in the policy configuration, and identifying second policy statements included in the modified policy configuration and not included in the policy configuration.

Some implementations described herein relate to a device that may include one or more memories and one or more processors. The one or more processors may be configured to detect a first event associated with modifying a policy configuration, associated with a group of virtual network devices of a cloud computing environment, and to generate a modified policy configuration. The one or more processors may be configured to retrieve the modified policy configuration based on the first event, and establish connections with the group of virtual network devices. The one or more processors may be configured to receive the policy configuration from the group of virtual network devices based on establishing the connections with the group of virtual network devices, and identify first policy statements not included in the modified policy configuration and included in the policy configuration. The one or more processors may be configured to identify second policy statements included in the modified policy configuration and not included in the policy configuration.

Some implementations described herein relate to a non-transitory computer-readable medium that stores a set of instructions. The set of instructions, when executed by one or more processors of a device, may cause the device to detect a first event associated with modifying a policy configuration, associated with a group of virtual network devices of a cloud computing environment, and to generate a modified policy configuration. The set of instructions, when executed by one or more processors of the device, may cause the device to retrieve the modified policy configuration based on the first event, and establish connections with the group of virtual network devices. The set of instructions, when executed by one or more processors of the device, may cause the device to receive the policy configuration from the group of virtual network devices based on establishing the connections with the group of virtual network devices, and identify first policy statements not included in the modified policy configuration and included in the policy configuration. The set of instructions, when executed by one or more processors of the device, may cause the device to identify second policy statements included in the modified policy configuration and not included in the policy configuration, and cause the first policy statements to be deleted from the group of virtual network devices. The set of instructions, when executed by one or more processors of the device, may cause the device to cause the second policy statements to be added to the group of virtual network devices, wherein deletion of the first policy statements and addition of the second policy statements causes the group of virtual network devices to be resynchronized with the modified policy configuration.

BRIEF DESCRIPTION OF THE DRAWINGS

FIGS. 4 and 5 are flowcharts of example processes for providing a centralized secure policy configuration synchronization mechanism for virtual network devices.

DETAILED DESCRIPTION

Figure 1A:
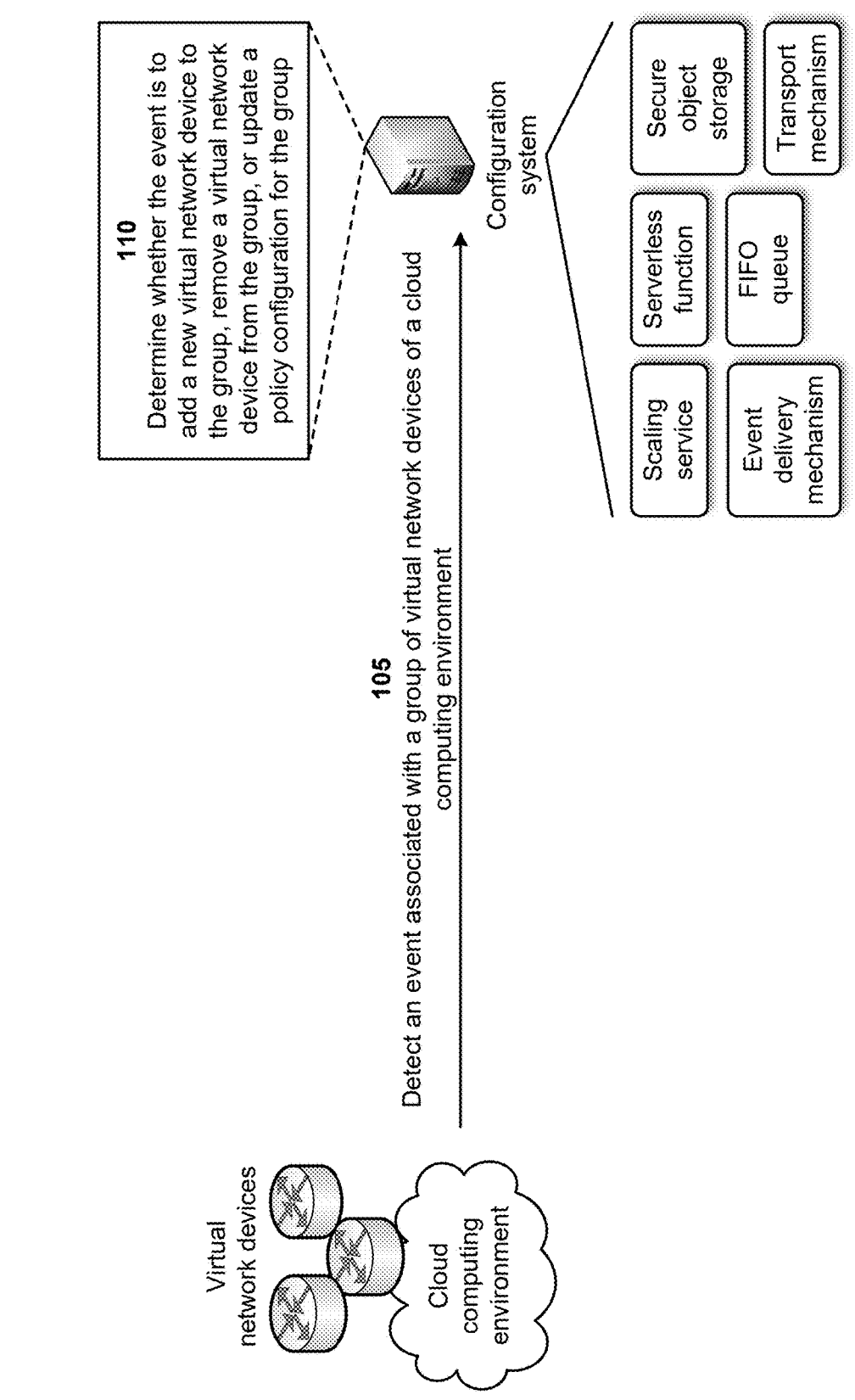
FIGS. 1A-1E are diagrams of an example associated with providing a centralized secure policy configuration synchronization mechanism for virtual network devices.

The following detailed description of example implementations refers to the accompanying drawings. The same reference numbers in different drawings may identify the same or similar elements.

Grouping several virtual network devices together enables an IaaS vendor to create, in a cloud computing environment, a centralized secure virtual private network (VPN) (e.g., a VPN, a virtual private cloud (VPC), an on premises data center, and/or the like) that can inspect network traffic within the cloud computing environment and a corresponding data center. The scaling service may select a minimum quantity, a maximum quantity, and a desired quantity of virtual network devices to provision, and may attach a network load balancer to the virtual network devices. The scaling service may also provision the virtual network devices in different availability zones (e.g., for improved availability). Each virtual network device in the group may be an independent entity that performs network traffic security inspection.

Due to the dynamic nature of adding virtual network devices to the group, there is a need to perform policy configuration synchronization across all virtual network devices in the group (e.g., to make each virtual network device instance the same). A current technique for performing policy configuration synchronization across virtual network devices in a group is to utilize user data to provision the virtual network devices. However, there is a limit on the quantity of characters that can be used with the user data and the policy configuration can be pushed only once during the initial creation of the virtual network device. Another technique for performing policy configuration synchronization across virtual network devices in a group is to use a cloud-based software as a service (SaaS) that manages the virtual network devices in the group. However, this requires the additional cost and complexity of managing the life cycle of the virtual network devices during a scale-out and incremental policy configuration updates. Another concern is that a customer network (e.g., the VPN) is exposed to the SaaS application. Thus, current techniques for performing policy configuration synchronization across virtual network devices in a group consume computing resources (e.g., processing resources, memory resources, communication resources, and/or the like), networking resources, and/or other resources associated with failing to synchronize incremental updates of a policy configuration to all virtual network devices in a group, managing the life cycle of the virtual network devices during a scale-out and incremental policy configuration updates, unnecessarily exposing the customer network to security risks (e.g., an SaaS application), handling security breaches caused by exposing the customer network to security risks, and/or the like.

Some implementations described herein relate to a configuration system that provides a centralized secure policy configuration synchronization mechanism for virtual network devices. For example, the configuration system may detect a first event associated with modifying a policy configuration to generate a modified policy configuration for a group of virtual network devices of a cloud computing environment, and may retrieve the modified policy configuration. The configuration system may establish connections with the group of virtual network devices, and may receive the policy configuration from the group of virtual network devices based on establishing the connections with the group of virtual network devices. The configuration system may identify first policy statements not included in the modified policy configuration and included in the policy configuration, and may identify second policy statements included in the modified policy configuration and not included in the policy configuration. The configuration system may cause the first policy statements to be deleted from the group of virtual network devices, and may cause the second policy statements to be added to the group of virtual network devices.

In this way, the configuration system provides a centralized secure policy configuration synchronization mechanism for virtual network devices. For example, the configuration system may provide an asynchronous serverless event-driven mechanism to synchronize a policy configuration across all virtual network devices in a group. The event-driven mechanism may be easier to build and maintain, in a cost-effective manner, in a customer-secure network. The policy configuration may include security policies, security rules, network feeds, and/or the like. The configuration system may perform a policy configuration synchronization when a new virtual network device is instantiated during initial provisioning or as a replacement instance so that the policy configuration of the new virtual network device matches a policy configuration of existing virtual network devices in the group. The configuration system may also perform a policy configuration synchronization when the policy configuration is to be dynamically provided to all of the virtual network devices in the group. Thus, the configuration system may conserve computing resources, networking resources, and/or other resources that would have otherwise been consumed by failing to synchronize incremental updates of a policy configuration to all virtual network devices in a group, managing the life cycle of the virtual network devices during a scale-out and incremental policy configuration updates, unnecessarily exposing the customer network to security risks (e.g., an SaaS application), handling security breaches caused by exposing the customer network to security risks, and/or the like. The configuration system may execute in a customer environment and may only execute when configuration synchronization is needed and not when idle. The configuration system may provide virtual network device configuration data over a network that is located within a customer's virtual private network, which enhances security.

FIGS. 1A-1E are diagrams of an example 100 associated with providing a centralized secure policy configuration synchronization mechanism for virtual network devices. As shown in FIGS. 1A-1E, example 100 includes a configuration system associated with a cloud computing environment of a group of virtual network devices. The configuration system may include a system that provides a centralized secure policy configuration synchronization mechanism for virtual network devices. Each of the virtual network devices may include a virtual router, a virtual gateway, a virtual base station, and/or the like. Further details of the configuration system, the cloud computing environment, and the group of virtual network devices are provided elsewhere herein.

As shown in FIG. 1A, the configuration system may include multiple IaaS services, such as a scaling service, a serverless function service, a secure object storage service, an event delivery mechanism, a first-in-first-out (FIFO) queue service, a transport mechanism, and/or the like. The scaling service may include a service that provides a logical way to group virtual network devices together and behind a load balancer, where the group of virtual network devices may need a policy configuration synchronization. The serverless function service may include a service that enables execution of code on demand without requiring management of an infrastructure. The secure object storage service may include a service that provides a data structure (e.g., object storage, a database, a table, a list, and/or the like) that stores a centralized policy configuration as a file. The event delivery mechanism may include a mechanism that delivers events from different sources to the serverless function service. The FIFO queue service may include a service that provides a FIFO queue for storing event messages and handling an asynchronous policy configuration push. The transport mechanism may include a protocol (e.g., a network configuration protocol, such as NETCONF) that provides the policy configuration to the virtual network devices over a secure shell (SSH). The multiple IaaS services may enable the configuration system to provide an event-driven architecture that facilitates performing a policy configuration synchronization across available virtual network devices in a device group. A centralized vendor-specific policy configuration file may be defined and stored in the secure object storage. The serverless function service may execute when a scale-out or a centralized policy configuration change event occurs and may synchronize the centralized policy configuration with the virtual network devices in the device group.

As further shown in FIG. 1A, and by reference number 105, the configuration system may detect an event associated with a group of virtual network devices of a cloud computing environment. For example, an event may be generated based on a variety sources, such as based on the cloud computing environment, the group of virtual network devices, a load balancer associated with the group of virtual network devices, and/or the like. In some implementations, the event may be generated by the scaling service of the configuration system and may indicate that a new virtual network device be created and added to the group of virtual network devices. For example, the scaling service may create a new virtual network device instance and may trigger the serverless function service with a "launch or create new virtual network device" event. The serverless function service may add, to the FIFO queue service, a message indicating that there is a new virtual network device (e.g., added to the group) that requires an initial policy configuration.

In some implementations, the event may be generated by the scaling service of the configuration system and may request that a virtual network device of the group be removed or terminated. For example, the scaling service may terminate a virtual network device and may trigger the serverless function service with a "terminate virtual network device" event. In some implementations, the event may be generated by the secure object storage service of the configuration system when the policy configuration file is modified or a new policy configuration file is generated. The secure object storage service may notify the serverless function service about the modified policy configuration file or the new policy configuration file, and the serverless function service may resynchronize the group of virtual network devices with the modified policy configuration file or the new policy configuration file. In some implementations, the event may be generated by a time-based housekeeping service of the configuration system and may request determination of whether the policy configuration of the group of virtual network devices are synchronized. In some implementations, the event may be generated by a user of the configuration system and may request a resynchronization of the group of virtual network devices.

As further shown in FIG. 1A, and by reference number 110, the configuration system may determine whether the event is to add a new virtual network device to the group, remove a virtual network device from the group, or update a policy configuration for the group. For example, the configuration system may analyze the event, and may determine a type of the event based on analyzing the event. In some implementations, the configuration system may determine that the event is to add a new virtual network device to the group when the event is generated by the scaling service of the configuration system and requests that a new virtual network device be created and added to the group of virtual network devices. Alternatively, the configuration system may determine that the event is to remove a virtual network device from the group when the event is generated by the scaling service of the configuration system and requests that a virtual network device of the group of virtual network devices be removed or terminated. Alternatively, the configuration system may determine that the event is to update a policy configuration for the group of virtual network devices when the event is generated by the secure object storage service of the configuration system and indicates that the policy configuration file is modified or a new policy configuration file is generated.

Figure 1B:
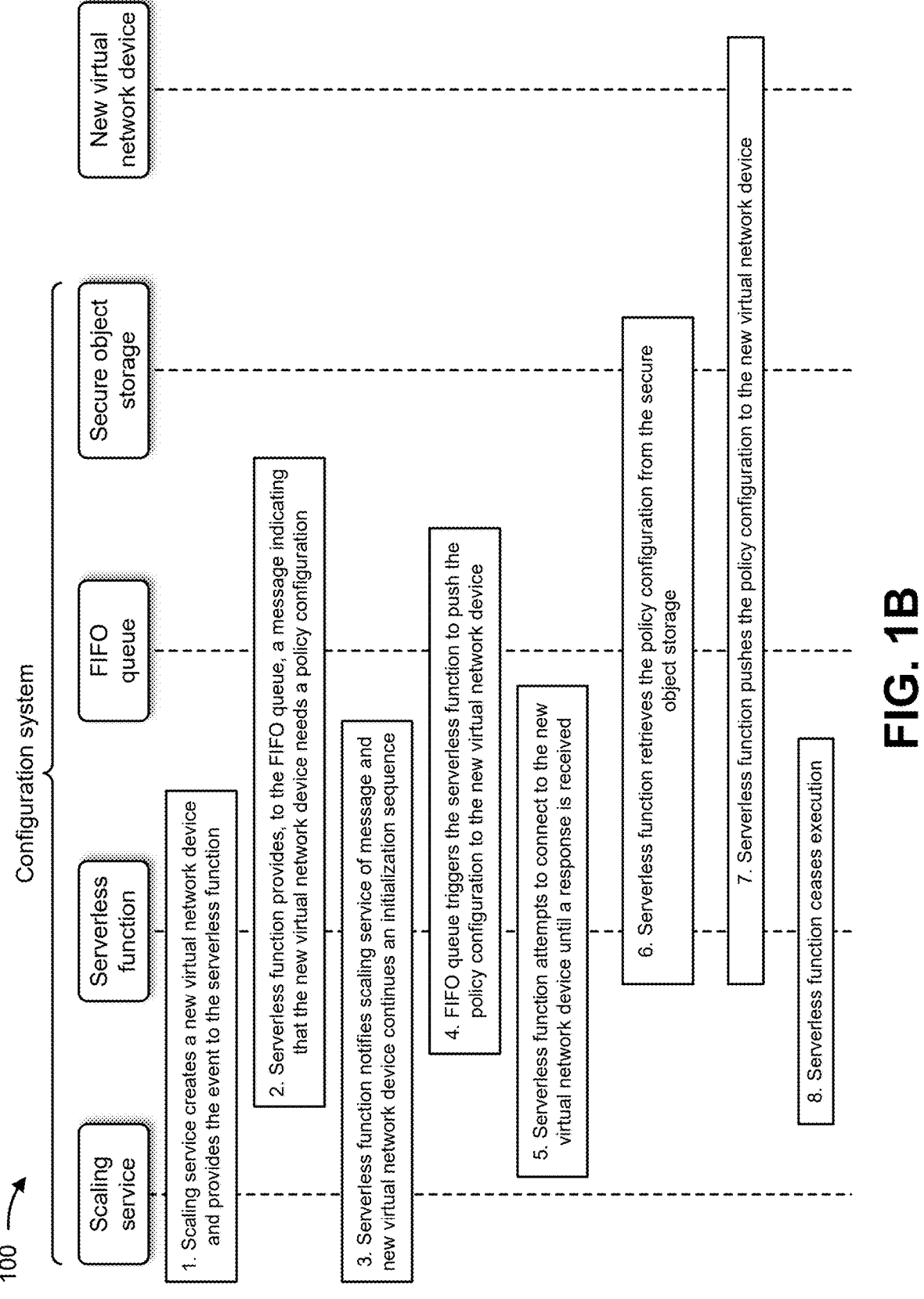

FIG. 1B is a call flow diagram depicting functions performed by the configuration system when the event is to add a new virtual network device to the group of virtual network devices. The configuration system may scale out a new virtual network device due to a health check failure of a virtual network device in the group, a breach of processor utilization by the group of virtual network devices, a request to increase the quantity of virtual network devices in the group, and/or the like. As shown at step 1 of FIG. 1B, when the event is to add the new virtual network device, the scaling service may create the new virtual network device in the cloud computing environment, and may provide a message identifying the event (e.g., an asynchronous create event message) to the serverless function service. As shown at step 2, the serverless function service may provide, to the FIFO queue service, a message (e.g., an asynchronous configuration message) indicating that the new virtual network device needs a policy configuration. In some implementations, the message may include metadata, such as an identifier of the new virtual network device, a management network address of the new virtual network device, and/or the like.

As shown at step 3 of FIG. 1B, the serverless function service may notify the scaling service (e.g., with an asynchronous continue message) about the message provided to the FIFO queue service. The new virtual network device may continue an initialization sequence at this time. As shown at step 4, the FIFO queue service may trigger the serverless function service (e.g., with an asynchronous configuration message) to push the policy configuration to the new virtual network device. As shown at step 5, the serverless function service may attempt (e.g., with a NETCONF connection over SSH and an asynchronous connect message) to connect to the new virtual network device until a response is received from the new virtual network device. If the new virtual network device fails to respond within a threshold time period, the serverless function service may provide, to the FIFO queue service, a message indicating that the new virtual network device failed to respond in time.

As shown at step 6 of FIG. 1B, the serverless function service may retrieve the policy configuration file from the secured object storage service (e.g., with an asynchronous fetch command). As shown at step 7, the serverless function service may utilize the established connection with the new virtual network device to push the policy configuration to the new virtual network device. The new virtual network device may receive and install the policy configuration. As shown at step 8, the serverless function service may cease execution after pushing the policy configuration to the new virtual network device.

Figure 1C:
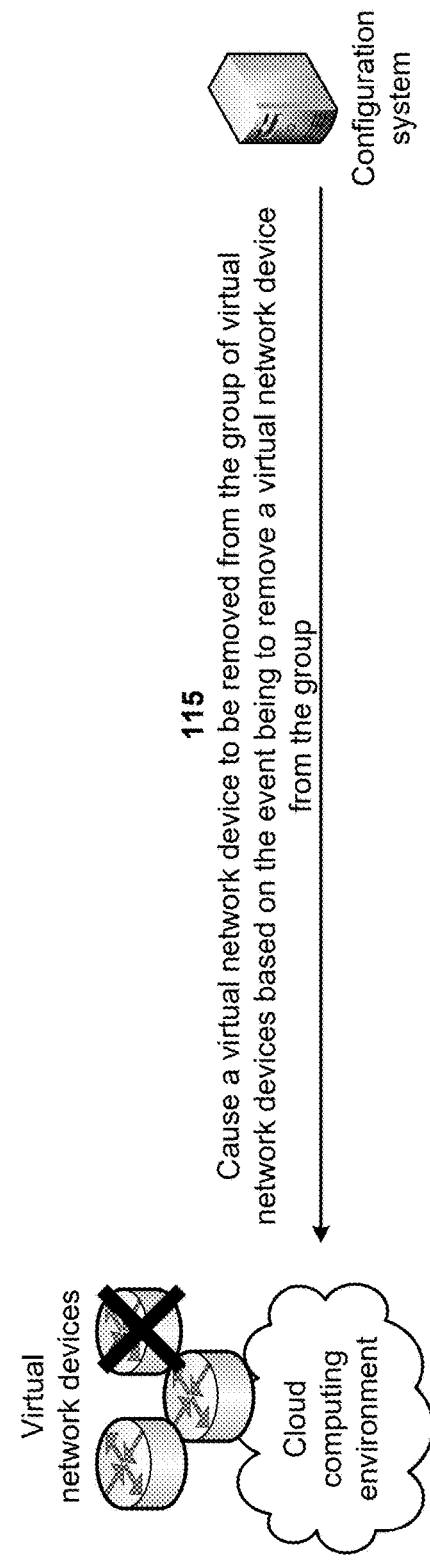

When the event is to remove a virtual network device from the group of virtual network devices, as shown in FIG. 1C, and by reference number 115, the configuration system may cause a virtual network device to be removed from the group of virtual network devices based on the event being to remove a virtual network device from the group. For example, the event may be generated by the scaling service of the configuration system and may request that a virtual network device of the group be removed or terminated. Based on the event, the scaling service may remove the virtual network device from the group of virtual network devices.

Figure 1D:
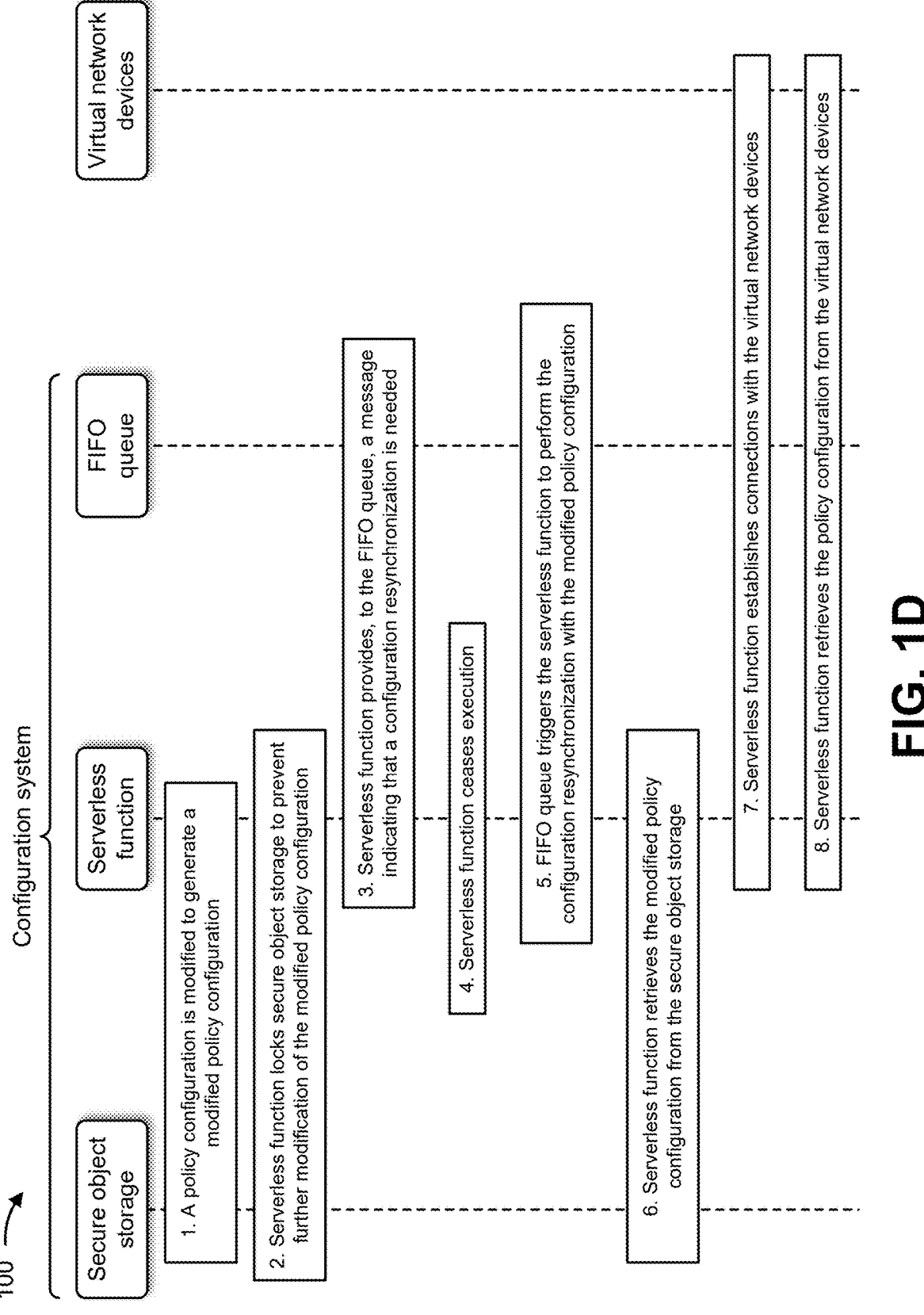
Figure 1E:
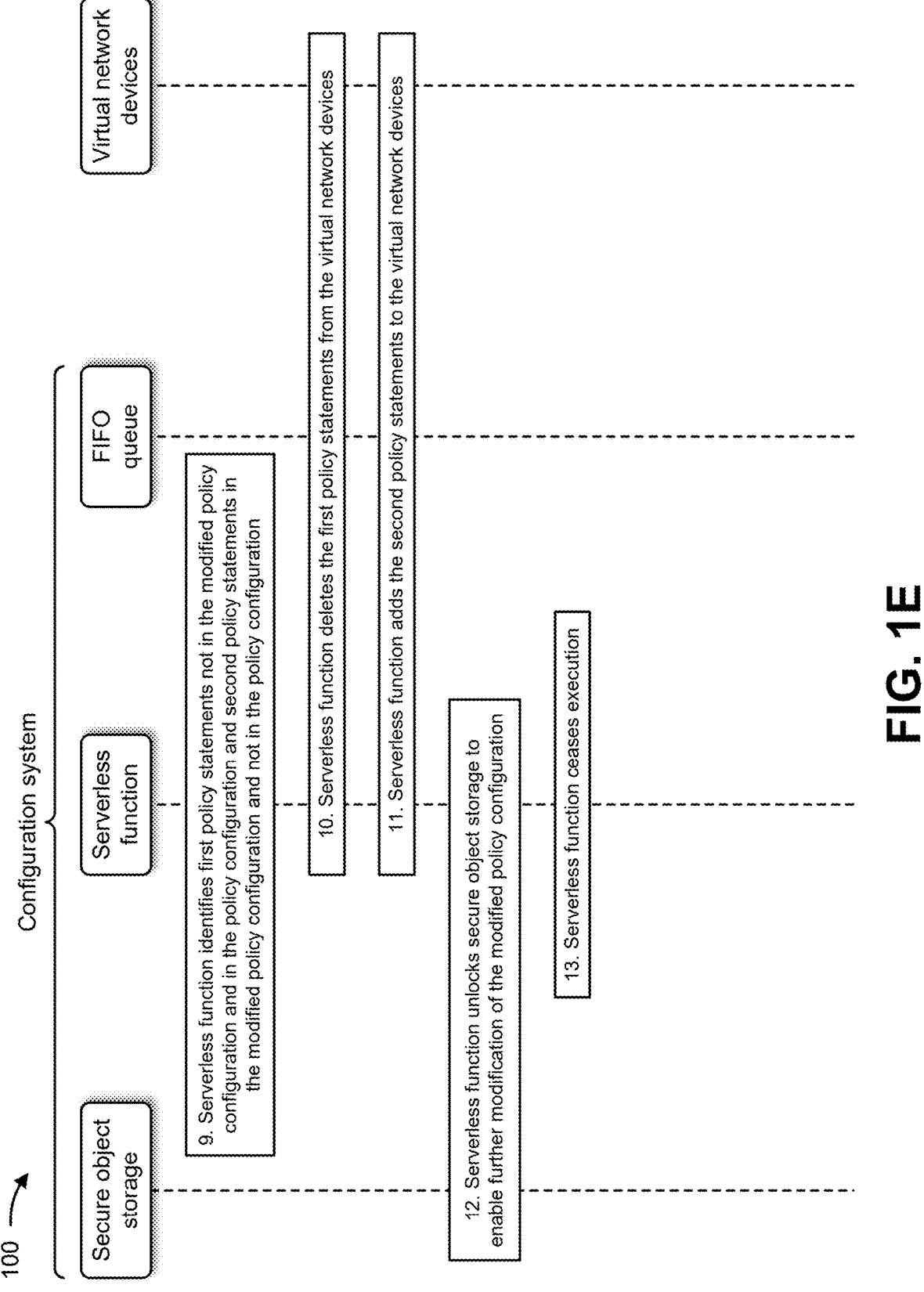

FIGS. 1D and 1E provide a call flow diagram depicting functions performed by the configuration system when the event is to update a policy configuration for the group of virtual network devices (e.g., due to modification of the policy configuration). As shown at step 1 of FIG. 1D, a policy configuration may be modified in the secure object storage service to generate a modified policy configuration. The secure object storage service may generate an asynchronous modify event message and may provide the message to the serverless function service. As shown at step 2, the serverless function service may lock the secure object storage to prevent further modification of the modified policy configuration until the modified policy configuration is synchronized to the group of virtual network devices. As shown at step 3, the serverless function service may provide, to the FIFO queue service, a message (e.g., an asynchronous resynchronization message) indicating that a policy configuration resynchronization is needed for the group of virtual network devices. In some implementations, the message may include metadata, such as identifiers of virtual network devices, management network addresses of the virtual network devices, and/or the like. As shown at step 4, the serverless function service may cease execution after providing the message to the FIFO queue service.

As shown at step 5 of FIG. 1D, the FIFO queue service may trigger the serverless function (e.g., with an asynchronous resynchronization message) to perform the policy configuration resynchronization with the modified policy configuration. As shown at step 6, the serverless function service may retrieve the modified policy configuration file from the secured object storage service (e.g., with an asynchronous fetch command). As shown at step 7, the serverless function service may establish connections with the group of virtual network devices (e.g., NETCONF SSH connections). As shown at step 8, the serverless function service may retrieve the policy configuration from the group of virtual network devices via the connections established with the group of virtual network devices.

As shown at step 9 of FIG. 1E, the serverless function service may identify differences between the modified policy configuration and the policy configuration. For example, the serverless function service may identify first policy statements not included in the modified policy configuration and included in the policy configuration. The serverless function service may also identify second policy statements included in the modified policy configuration and not included in the policy configuration. As shown at step 10, the serverless function service may delete the first policy statements from the policy configuration stored in the group of virtual network devices (e.g., via the established connections with the group of virtual network devices). As shown at step 11, the service function service may add the second policy statements to the policy configuration stored in the group of virtual network devices (e.g., via the established connections with the group of virtual network devices). After deleting the first policy statements and adding the second policy statements, the group of virtual network devices may include the modified policy configuration. In some implementations, the serverless function service may create a new message for each virtual network device of the group to perform the policy configuration synchronization with the modified policy configuration, which increases parallelism and propagation time of a policy configuration change. As shown at step 12, the serverless function service may unlock the secure object storage service to enable further modification to the modified policy configuration. As shown at step 13, the serverless function service may cease execution after unlocking the secure object storage service.

In this way, the configuration system provides a centralized secure policy configuration synchronization mechanism for virtual network devices. For example, the configuration system may provide an asynchronous serverless event-driven mechanism to synchronize a policy configuration across all virtual network devices in a group. The event-driven mechanism may be easier to build and maintain, in a cost-effective manner, in a customer-secure network. The policy configuration may include security policies, security rules, network feeds, and/or the like. The configuration system may perform a policy configuration synchronization when a new virtual network device is instantiated during initial provisioning or as a replacement instance so that the policy configuration of the new virtual network device matches a policy configuration of existing virtual network devices in the group. The configuration system may also perform a policy configuration synchronization when the policy configuration is to be dynamically provided to all of the virtual network devices in the group. Thus, the configuration system may conserve computing resources, networking resources, and/or other resources that would have otherwise been consumed by failing to synchronize incremental updates of a policy configuration to all virtual network devices in a group, managing the life cycle of the virtual network devices during a scale-out and incremental policy configuration updates, unnecessarily exposing the customer network to security risks, handling security breaches caused by exposing the customer network to security risks, and/or the like.

Furthermore, the configuration system provides a highly reliable infrastructure using highly scalable event-driven services with serverless functions that offer high availability across multiple zones, which ensures that there is no single point of failure. The configuration system may only incur costs when services are active during the synchronization of the policy configuration. The configuration system provides security for customer data since the serverless function service and the centralized policy configuration execute within the customer's virtual private network (e.g., a VPN, a VPC, an on premises data center, and/or the like) and are not exposed. The configuration system also provides scale, provides low latency policy synchronization, and ensures that the virtual network devices in the group will be consistent at almost the same time (e.g., in milliseconds).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
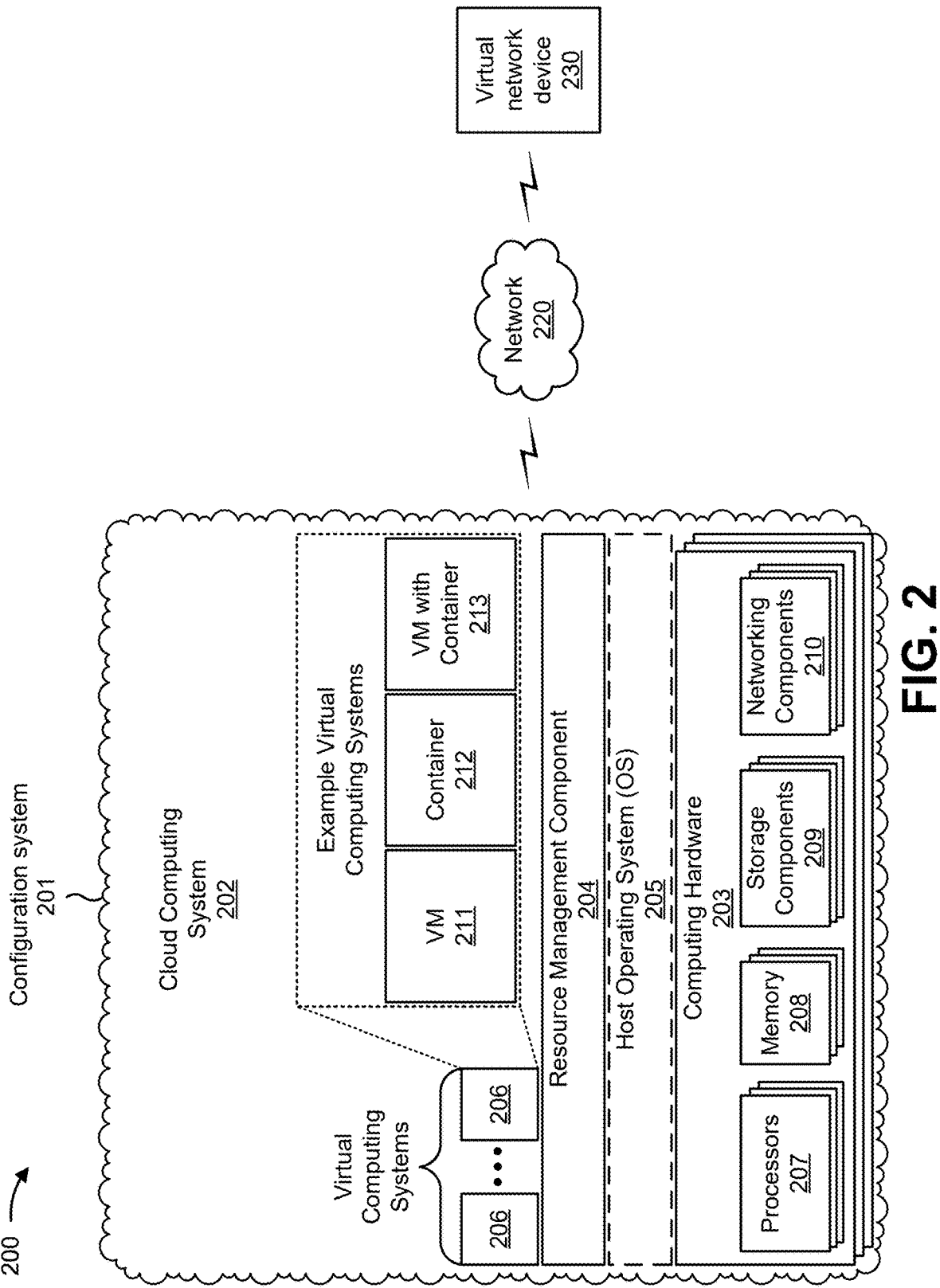
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include configuration system 201, which may include one or more elements of and/or may execute within a cloud computing system 202. The cloud computing system 202 may include one or more elements 203-213, as described in more detail below. As further shown in FIG. 2, the environment 200 may include a network 220, and/or a virtual network device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the configuration system 201 may include one or more elements 203-213 of the cloud computing system 202, may execute within the cloud computing system 202, and/or may be hosted within the cloud computing system 202, in some implementations, the configuration system 201 may not be cloud-based (e.g., may be implemented outside of a cloud computing system) or may be partially cloud-based. For example, the configuration system 201 may include one or more devices that are not part of the cloud computing system 202, such as a device 300 of FIG. 3, which may include a standalone server or another type of computing device. The configuration system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The virtual network device 230 may include one or more devices capable of receiving, processing, storing, routing, and/or providing traffic (e.g., a packet and/or other information or metadata) in a manner described herein. For example, the virtual network device 230 may include a router, such as a label switching router (LSR), a label edge router (LER), an ingress router, an egress router, a provider router (e.g., a provider edge router or a provider core router), a virtual router, or another type of router. Additionally, or alternatively, the virtual network device 230 may include a gateway, a switch, a firewall, a hub, a bridge, a reverse proxy, a server (e.g., a proxy server, a cloud server, or a data center server), a load balancer, and/or a similar device. In some implementations, the virtual network device 230 may be a physical device implemented within a housing, such as a chassis. In some implementations, the virtual network device 230 may be a virtual device implemented by one or more computing devices of a cloud computing environment or a data center. In some implementations, a group of virtual network devices 230 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
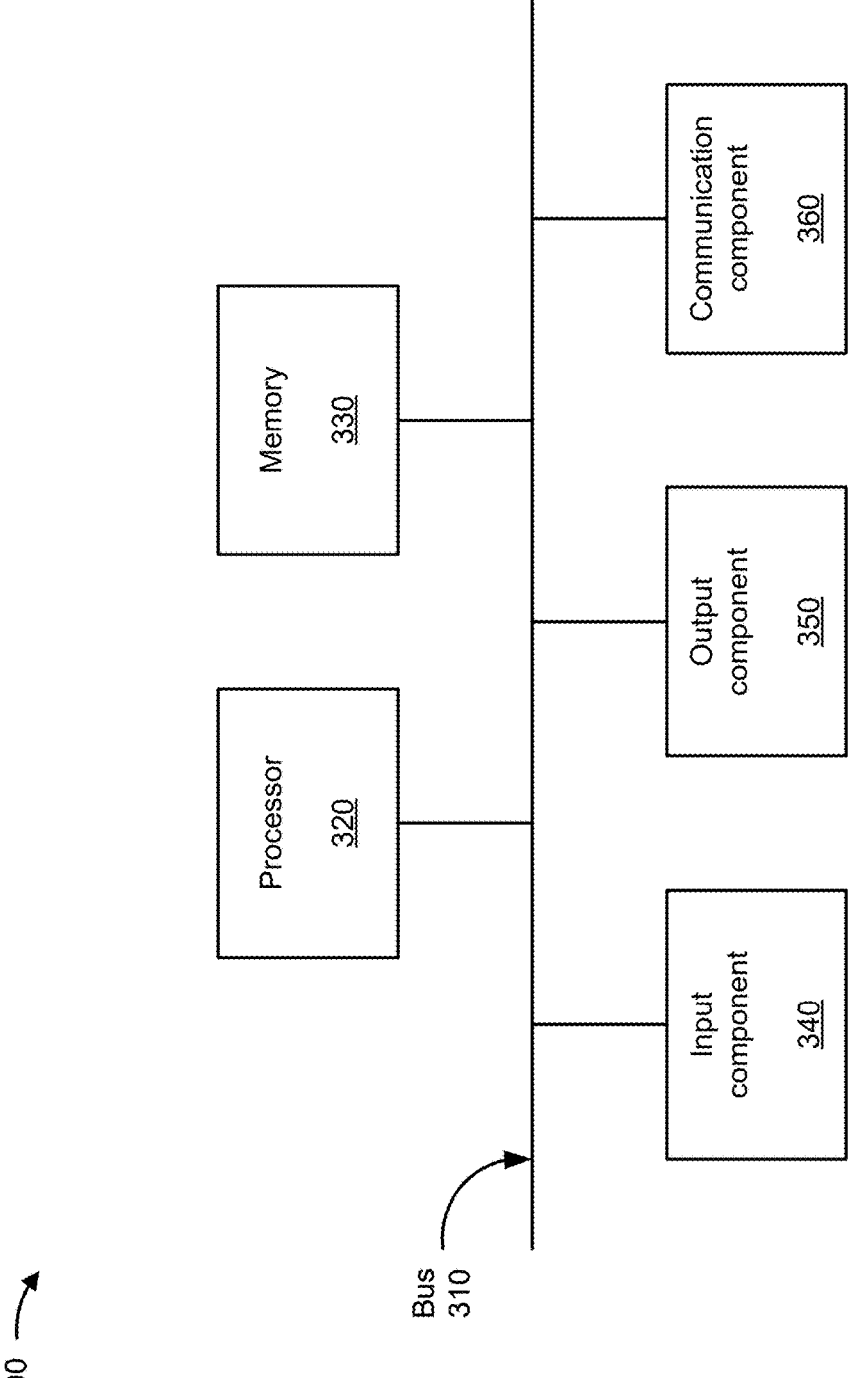
FIG. 3 is a diagram of example components of one or more devices of FIG. 2.

FIG. 3 is a diagram of example components of a device 300, which may correspond to the configuration system 201 and/or the virtual network device 230. In some implementations, the configuration system 201 and/or the virtual network device 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a lightemitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for providing a centralized secure policy configuration synchronization mechanism for virtual network devices. In some implementations, one or more process blocks of FIG. 4 may be performed by a device (e.g., the configuration system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include detecting a first event associated with modifying a policy configuration, associated with a group of virtual network devices of a cloud computing environment, and to generate a modified policy configuration (block 410). For example, the device may detect a first event associated with modifying a policy configuration, associated with a group of virtual network devices of a cloud computing environment, and to generate a modified policy configuration, as described above. In some implementations, the device includes a scaling service, a serverless function service, a queue service, and a secure object storage service.

As further shown in FIG. 4, process 400 may include retrieving the modified policy configuration based on the first event (block 420). For example, the device may retrieve the modified policy configuration based on the first event, as described above. In some implementations, retrieving the modified policy configuration based on the first event includes retrieving the modified policy configuration from a secure object storage service of the device based on the first event.

As further shown in FIG. 4, process 400 may include establishing connections with the group of virtual network devices (block 430). For example, the device may establish connections with the group of virtual network devices, as described above.

As further shown in FIG. 4, process 400 may include receiving the policy configuration from the group of virtual network devices based on establishing the connections with the group of virtual network devices (block 440). For example, the device may receive the policy configuration from the group of virtual network devices based on establishing the connections with the group of virtual network devices, as described above.

As further shown in FIG. 4, process 400 may include identifying first policy statements not included in the modified policy configuration and included in the policy configuration (block 450). For example, the device may identify first policy statements not included in the modified policy configuration and included in the policy configuration, as described above.

As further shown in FIG. 4, process 400 may include identifying second policy statements included in the modified policy configuration and not included in the policy configuration (block 460). For example, the device may identify second policy statements included in the modified policy configuration and not included in the policy configuration, as described above.

In some implementations, process 400 includes preventing further modification of the modified policy configuration until the group of virtual network devices are resynchronized with the modified policy configuration. In some implementations, process 400 includes causing the first policy statements to be deleted from the group of virtual network devices, and causing the second policy statements to be added to the group of virtual network devices, wherein deletion of the first policy statements and addition of the second policy statements causes the group of virtual network devices to be resynchronized with the modified policy configuration.

In some implementations, process 400 includes enabling further modification of the modified policy configuration after the group of virtual network devices are resynchronized with the modified policy configuration. In some implementations, process 400 includes preventing further modification of the modified policy configuration until the group of virtual network devices are resynchronized with the modified policy configuration, and enabling further modification of the modified policy configuration after the group of virtual network devices are resynchronized with the modified policy configuration.

In some implementations, process 400 includes detecting a second event associated with adding a new virtual network device to the group of virtual network devices, causing, based on the second event, the new virtual network device to be created in the cloud computing environment, associating the new virtual network device with the group of virtual network devices, retrieving the policy configuration associated with the group of virtual network devices, establishing a connection with the new virtual network device, and providing the policy configuration to the new virtual network device based on establishing the connection with the new virtual network device and to cause the virtual network device to install the policy configuration. In some implementations, causing the new virtual network device to be created in the cloud computing environment includes utilizing a scaling service of the device to cause the new virtual network device to be created in the cloud computing environment.

In some implementations, retrieving the policy configuration associated with the group of virtual network devices includes providing, to a queue service of the device, a message indicating that the new virtual network device needs the policy configuration, and receiving a trigger to provide the policy configuration to the new virtual network device, wherein retrieving the policy configuration associated with the group of virtual network devices includes retrieving the policy configuration associated with the group of virtual network devices based on the trigger. In some implementations, retrieving the policy configuration associated with the group of virtual network devices includes retrieving the policy configuration associated with the group of virtual network devices from a secure object storage service of the device. In some implementations, detecting the second event associated with adding the new virtual network device to the group of virtual network devices includes detecting the second event associated with adding the new virtual network device based on a health check failure associated with the group of virtual network devices.

In some implementations, process 400 includes detecting a second event associated with removing a virtual network device from the group of virtual network devices of the cloud computing environment, and causing, based on the second event, the virtual network device to be removed from the group of virtual network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 depicts a flowchart of an example process 500 for providing a centralized secure policy configuration synchronization mechanism for virtual network devices. In some implementations, one or more process blocks of FIG. 5 may be performed by a device (e.g., the policy system 201). In some implementations, one or more process blocks of FIG. 5 may be performed by another device or a group of devices separate from or including the device. Additionally, or alternatively, one or more process blocks of FIG. 5 may be performed by one or more components of the device 300, such as the processor 320, the memory 330, the input component 340, the output component 350, and/or the communication component 360.

As shown in FIG. 5, process 500 may include detecting a first event associated with adding a new virtual network device to a group of virtual network devices of a cloud computing environment (block 510). For example, the device may detect a first event associated with adding a new virtual network device to a group of virtual network devices of a cloud computing environment, as described above.

As further shown in FIG. 5, process 500 may include causing, based on the first event, the new virtual network device to be created in the cloud computing environment (block 520). For example, the device may cause, based on the first event, the new virtual network device to be created in the cloud computing environment, as described above.

As further shown in FIG. 5, process 500 may include associating the new virtual network device with the group of virtual network devices (block 530). For example, the device may associate the new virtual network device with the group of virtual network devices, as described above.

As further shown in FIG. 5, process 500 may include retrieving a policy configuration associated with the group of virtual network devices (block 540). For example, the device may retrieve a policy configuration associated with the group of virtual network devices, as described above.

As further shown in FIG. 5, process 500 may include establishing a connection with the new virtual network device (block 550). For example, the device may establish a connection with the new virtual network device, as described above.

As further shown in FIG. 5, process 500 may include providing the policy configuration to the new virtual network device based on establishing the connection with the new virtual network device and to cause the virtual network device to install the policy configuration (block 560). For example, the device may provide the policy configuration to the new virtual network device based on establishing the connection with the new virtual network device and to cause the virtual network device to install the policy configuration, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

detecting, by a device, a first event associated with modifying a policy configuration, associated with a group of virtual network devices of a cloud computing environment, and to generate a modified policy configuration;

retrieving, by the device, the modified policy configuration based on the first event;

establishing, by the device, connections with the group of virtual network devices;

receiving, by the device, the policy configuration from the group of virtual network devices based on establishing the connections with the group of virtual network devices;

identifying, by the device, first policy statements not included in the modified policy configuration and included in the policy configuration;

identifying, by the device, second policy statements included in the modified policy configuration and not included in the policy configuration;

causing the first policy statements to be deleted from the group of virtual network devices; and causing the second policy statements to be added to the group of virtual network devices, wherein deletion of the first policy statements and addition of the second policy statements causes the group of virtual network devices to be resynchronized with the modified policy configuration.

2. The method of claim 1, wherein retrieving the modified policy configuration based on the first event comprises:

retrieving the modified policy configuration from a secure object storage service of the device based on the first event.

3. The method of claim 1, further comprising:

preventing further modification of the modified policy configuration until the group of virtual network devices are resynchronized with the modified policy configuration.

4. The method of claim 1, further comprising:

enabling further modification of the modified policy configuration after the group of virtual network devices are resynchronized with the modified policy configuration.

5. The method of claim 1, further comprising:

preventing further modification of the modified policy configuration until the group of virtual network devices are resynchronized with the modified policy configuration; and enabling further modification of the modified policy configuration after the group of virtual network devices are resynchronized with the modified policy configuration.

6. The method of claim 1, wherein the device includes a scaling service, a serverless function service, a queue service, and a secure object storage service.

7. A device, comprising:

one or more memories; and one or more processors to:

detect a first event associated with modifying a policy configuration, associated with a group of virtual network devices of a cloud computing environment, and to generate a modified policy configuration;

retrieve the modified policy configuration based on the first event;

establish connections with the group of virtual network devices;

receive the policy configuration from the group of virtual network devices based on establishing the connections with the group of virtual network devices;

identify first policy statements not included in the modified policy configuration and included in the policy configuration;

identify second policy statements included in the modified policy configuration and not included in the policy configuration;

cause the first policy statements to be deleted from the group of virtual network devices; and cause the second policy statements to be added to the group of virtual network devices, wherein deletion of the first policy statements and addition of the second policy statements causes the group of virtual network devices to be resynchronized with the modified policy configuration.

8. The device of claim 7,
wherein the one or more processors are further to:
   detect a second event associated with adding a new virtual network device to the group of virtual network devices;
   cause, based on the second event, the new virtual network device to be created in the cloud computing environment;
   associate the new virtual network device with the group of virtual network devices;
   retrieve the policy configuration associated with the group of virtual network devices;
   establish a connection with the new virtual network device; and
   provide the policy configuration to the new virtual network device based on establishing the connection with the new virtual network device and to cause the virtual network device to install the policy configuration.

9. The device of claim 8,
wherein the one or more processors, to cause the new virtual network device to be created in the cloud computing environment, are to:
   utilize a scaling service of the device to cause the new virtual network device to be created in the cloud computing environment.

10. The device of claim 8,
wherein the one or more processors are further to:
   provide, to a queue service of the device, a message indicating that the new virtual network device needs the policy configuration; and
   receive a trigger to provide the policy configuration to the new virtual network device,
      wherein the one or more processors, to retrieve the policy configuration associated with the group of virtual network devices, are configured to:
         retrieve the policy configuration associated with the group of virtual network devices based on the trigger.

11. The device of claim 8,
wherein the one or more processors, to retrieve the policy configuration associated with the group of virtual network devices, are to:
   retrieve the policy configuration associated with the group of virtual network devices from a secure object storage service of the device.

12. The device of claim 8,
wherein the one or more processors, to detect the second event associated with adding the new virtual network device to the group of virtual network devices, are to:
   detect the second event associated with adding the new virtual network device based on a health check failure associated with the group of virtual network devices.

13. The device of claim 7,
wherein the one or more processors are further to:
   detect a second event associated with removing a virtual network device from the group of virtual network devices of the cloud computing environment; and
   cause, based on the second event, the virtual network device to be removed from the group of virtual network devices.

14. A non-transitory computer-readable medium storing a set of instructions, the set of instructions comprising:
   one or more instructions that, when executed by one or more processors of a device, cause the device to:

detect a first event associated with modifying a policy configuration, associated with a group of virtual network devices of a cloud computing environment, and to generate a modified policy configuration;
      retrieve the modified policy configuration based on the first event;
      establish connections with the group of virtual network devices;
      receive the policy configuration from the group of virtual network devices based on establishing the connections with the group of virtual network devices;
      identify first policy statements not included in the modified policy configuration and included in the policy configuration;
      identify second policy statements included in the modified policy configuration and not included in the policy configuration;
      cause the first policy statements to be deleted from the group of virtual network devices; and
      cause the second policy statements to be added to the group of virtual network devices,
         wherein deletion of the first policy statements and addition of the second policy statements causes the group of virtual network devices to be resynchronized with the modified policy configuration.

15. The non-transitory computer-readable medium of claim 14,
wherein the one or more instructions, that cause the device to retrieve the modified policy configuration based on the first event, cause the device to:
   retrieve the modified policy configuration from a secure object storage service of the device based on the first event.

16. The non-transitory computer-readable medium of claim 14,
wherein the one or more instructions further cause the device to:
   prevent further modification of the modified policy configuration until the group of virtual network devices are resynchronized with the modified policy configuration.

17. The non-transitory computer-readable medium of claim 14,
wherein the one or more instructions further cause the device to:
   enable further modification of the modified policy configuration after the group of virtual network devices are resynchronized with the modified policy configuration.

18. The non-transitory computer-readable medium of claim 14,
wherein the one or more instructions further cause the device to:
   prevent further modification of the modified policy configuration until the group of virtual network devices are resynchronized with the modified policy configuration; and
   enable further modification of the modified policy configuration after the group of virtual network devices are resynchronized with the modified policy configuration.

19. The non-transitory computer-readable medium of claim 14,
wherein the one or more instructions further cause the device to:

detect a second event associated with adding a new virtual network device to the group of virtual network devices;

cause, based on the second event, the new virtual network device to be created in the cloud computing environment;

associate the new virtual network device with the group of virtual network devices;

retrieve the policy configuration associated with the group of virtual network devices;

establish a connection with the new virtual network device; and provide the policy configuration to the new virtual network device based on establishing the connection with the new virtual network device and to cause the virtual network device to install the policy configuration.

20. The non-transitory computer-readable medium of claim 14, wherein the one or more instructions further cause the device to:

detect a second event associated with removing a virtual network device from the group of virtual network devices of the cloud computing environment; and cause, based on the second event, the virtual network device to be removed from the group of virtual network devices.

* * * * *